US009916238B2

(12) United States Patent
Shaharabany et al.

(10) Patent No.: US 9,916,238 B2
(45) Date of Patent: Mar. 13, 2018

(54) MEMORY SYSTEM AND METHOD FOR PERFORMING GARBAGE COLLECTION ON BLOCKS BASED ON THEIR OBSOLESCENCE PATTERNS

(71) Applicant: SanDisk Technologies Inc., Plano, TX (US)

(72) Inventors: Amir Shaharabany, Kochav Yair (IL); Hadas Oshinsky, Kfar Saba (IL); Rotem Sela, Haifa (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/835,316

(22) Filed: Aug. 25, 2015

(65) Prior Publication Data

US 2017/0060738 A1    Mar. 2, 2017

(51) Int. Cl.
*G06F 12/02*         (2006.01)
(52) U.S. Cl.
CPC ...... *G06F 12/0253* (2013.01); *G06F 12/0246* (2013.01); *G06F 2212/1044* (2013.01); *G06F 2212/7205* (2013.01)

(58) Field of Classification Search
CPC ............... G06F 12/0253; G06F 2212/1044
See application file for complete search history.

(56) References Cited

U.S. PATENT DOCUMENTS

| | | | |
|---|---|---|---|
| 2008/0082596 A1* | 4/2008 | Gorobets | G06F 12/0253 |
| 2011/0271070 A1* | 11/2011 | Worthington | G06F 12/1009 711/165 |
| 2012/0005415 A1* | 1/2012 | Jung | G06F 12/0246 711/103 |
| 2013/0145078 A1* | 6/2013 | Cheng | G06F 12/0246 711/103 |
| 2014/0151783 A1* | 6/2014 | Park | H01L 27/11551 257/324 |
| 2016/0179386 A1* | 6/2016 | Zhang | G06F 3/064 711/103 |

* cited by examiner

*Primary Examiner* — Rocio Del Mar Perez-Velez
(74) *Attorney, Agent, or Firm* — Brinks Gilson & Lione

(57) ABSTRACT

A memory system and method are provided for performing garbage collection on blocks based on their obsolescence patterns. In one embodiment, a controller of a memory system classifies each of the plurality of blocks based on its obsolescence pattern and performs garbage collection only on blocks classified with similar obsolescence patterns. Other embodiments are possible, and each of the embodiments can be used alone or together in combination.

27 Claims, 7 Drawing Sheets

US 9,916,238 B2

MEMORY SYSTEM AND METHOD FOR PERFORMING GARBAGE COLLECTION ON BLOCKS BASED ON THEIR OBSOLESCENCE PATTERNS

BACKGROUND

Memory systems with non-volatile memories (such as flash memory) typically perform garbage collection on a group of memory blocks that are partially filled with valid data in order to store the valid data in a smaller group of blocks, thereby creating one or more empty blocks for storing new data. In general, the blocks that are targeted for garbage collection are typically those with the least amount of valid data to copy (i.e., the blocks with the lowest "valid count"). Valid data from the blocks with the lowest valid counts are copied to the same target block.

Some memory systems implement data identification methods in order to avoid mixing different data types (e.g., random data and sequential data) in the same block when that data is written to the memory, as such mixing may cause the garbage collection process to be inefficient. Random data is data that is likely to change shortly after it has been written to the memory, while sequential data is data that is likely to remain unchanged for a long period of time. Common methods for data identification are applied to "fresh" data that is written to the memory. At this stage, a number of blocks are open for writing according to the data type. For example, one open block may be dedicated to data of type "stream," while another block may be dedicated to random data written in small chunks, and yet a third block may be dedicated to random data written at a page resolution.

In a block containing both random and sequential data, the random data will become obsolete while the sequential data may still be valid. Such a block may, therefore, suffer from frequent garbage collection operations (like a hot block), with a large amount of data to be copied to a new block (like a cold block). In contrast, a block containing only sequential data will most probably stay stable, and garbage collection operations may be applied to such a block at a lower rate than the rate of garbage collection on a random block. Accordingly, avoiding mixing different data types when the data is initially written to memory can reduce system complexity and simplify the garbage collection process.

DETAILED DESCRIPTION

Figure 1:
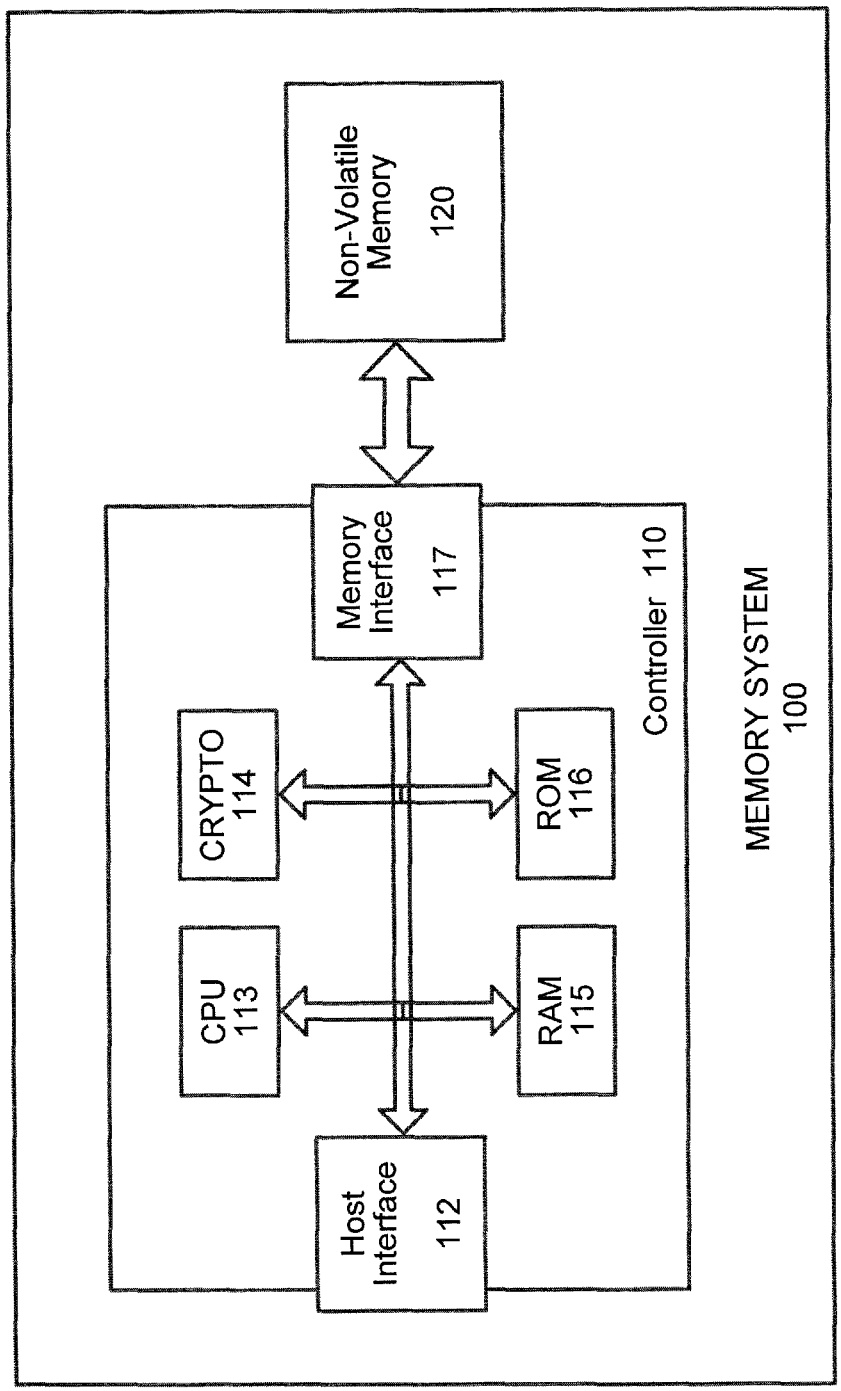
FIG. 1 is a block diagram of an exemplary memory system of an embodiment.

By way of introduction, the below embodiments relate to a memory system and method for performing garbage collection on blocks based on their obsolescence patterns. In one embodiment, a controller of a memory system classifies each of the plurality of blocks based on its obsolescence pattern and performs garbage collection only on blocks classified with similar obsolescence patterns.

In some embodiments, a block with an obsolescence pattern comprising a plurality of non-continuous invalid areas is classified as a random block, and a block with an obsolescence pattern comprising a plurality of continuous invalid areas is classified as a sequential block.

In some embodiments, the classifying is done after the plurality of blocks have been written to the memory and after at least some of the plurality of blocks written to the memory have been modified.

In some embodiments, the classifying is done after at least some of the plurality of blocks have gone through garbage collection.

In some embodiments, the classifying is done using a bitmap.

In some embodiments, the classifying is done as part of garbage collection.

In another embodiment, a memory system is provided comprising a memory and a controller. The controller is configured to determine locations of invalid areas in each of a plurality of blocks in the memory, assign each of the plurality of blocks with a type based on the locations of the invalid areas in each of the plurality of blocks, move valid data from blocks of a first type to a first target block, and move valid data from blocks of a second type to a second target block, wherein valid data from blocks of different types are moved to different target blocks. A method for performing the same is disclosed.

In some embodiments, a block is assigned to the first type when the invalid areas are located in non-continuous locations, and wherein a block is assigned to the second type when the invalid areas are located in continuous locations.

In some embodiments, the first type is random data, and a second type is sequential data.

In some embodiments, the determining is done after the plurality of blocks have been written to the memory and after at least some of the plurality of blocks written to the memory have been modified.

In some embodiments, the determining is done after at least some of the plurality of blocks have gone through garbage collection.

In some embodiments, the determining is done using a bitmap.

In some embodiments, the assigning is done as part of garbage collection.

In some embodiments, the memory is a three-dimensional memory.

In some embodiments, the memory system is embedded in a host, while, in other embodiments, the memory system is removably connected to a host.

Other embodiments are possible, and each of the embodiments can be used alone or together in combination.

As mentioned above, these embodiments generally relate to a memory system and method for performing garbage collection on blocks based on their obsolescence patterns. Before turning to several examples, the follow paragraphs present an exemplary memory system that can be used with these embodiments.

Turning now to the drawings, FIG. 1 is a block diagram of a memory system 100 of an embodiment. As shown in FIG. 1, the memory system 100 of this embodiment comprises a controller 110 in communication with a memory die 120. As used herein, the phrase "in communication with"

could mean directly in communication with or indirectly in communication with through one or more components, which may or may not be shown or described herein.

In general, the controller 110 transmits command sequences for read, program, and erase operations to the memory 120, and performs other functions, as will be discussed below. The controller 110 can be implemented in any suitable manner. For example, the controller 110 can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 110 can be configured with hardware and/or firmware to perform the various functions described below and shown in the flow diagrams. Also, some of the components shown as being internal to the controller 110 can also be stored external to the controller 110, and other components can be used.

In some embodiments, the memory 120 comprises a single memory die, while, in other embodiments, the memory 120 comprises at least one additional memory die. As used herein, the term "die" refers to the collection of non-volatile memory cells, and associated circuitry for managing the physical operation of those non-volatile memory cells, that are formed on a single semiconductor substrate. A memory die may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

As shown in FIG. 1, in one embodiment, the memory system's controller 110 comprises a host interface (or host interface module (HIM)) 112, a memory (or backend) interface 117, random access memory (RAM) 115, read only memory (ROM) 116 (e.g., to store system boot code), a central processing unit (CPU) (or "processor"), and a crypto-engine 114 to provide encryption and/or decryption operations. Of course, other or different components can be used. For example, the controller 100 can contain an error correction controller (ECC) engine to encode/decode data written to and read from the memory 120. The host interface 112 can take any suitable form, such as, but are not limited to, a SATA, SATA Express, SAS, Fibre Channel, USE, PCIe, and NVMe interface. The memory interface 117 can also take any suitable form, such as, but not limited to, a flash interface (e.g., Toggle Mode 200, 400, or 800).

In operation, the CPU 113 can read computer-readable program code (e.g., stored in ROM 116, RAM 115, or the memory 120) and execute that code to perform several functions, such as those discussed below and illustrated in the flow charts. More generally, the controller 110 can contain "circuitry" configured to perform various operations. As used herein, the term "circuitry" can refer to an instruction processor, such as a Central Processing Unit (CPU), microcontroller, or a microprocessor; or an Application Specific Integrated Circuit (ASIC), Programmable Logic Device (PLD), or Field Programmable Gate Array (FPGA); or a collection of discrete logic or other circuit components, including analog circuit components, digital circuit components or both; or any combination thereof. Circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, "circuitry" may store or access instructions for execution or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs and part of a library, such as a shared library like a Dynamic Link Library (DLL). The library, for example, may contain shared data and one or more shared programs that include instructions that perform any of the processing described above or illustrated in the drawings, when executed by the circuitry. Accordingly, "circuitry" may be implemented in many different ways and in many different combinations of hardware and software.

The memory system 100 can take any suitable form. For example, the memory system 100 can be a removable mass storage device, such as, but not limited to, a handheld, removable memory device, such as a memory card (e.g., a Secure Digital (SD) card, a micro Secure Digital (micro-SD) card, or a MultiMedia Card (MMC)), or a universal serial bus (USB) device. The memory system 100 can also take the form of an embedded mass storage device, such as an eSD/eMMC embedded flash drive or an embedded or removable solid state drive (SSD) found in, for example, portable computing devices, such as laptop computers, and tablet computers.

Figure 2A:
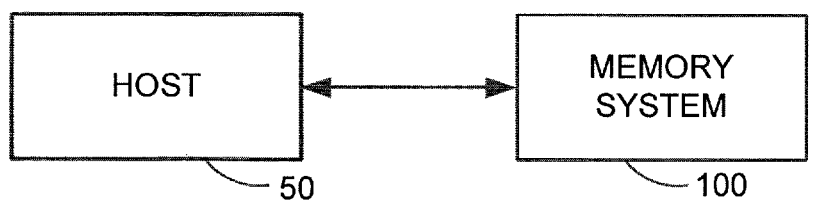
FIG. 2A is a block diagram of a memory system of an embodiment removably connected to a host.
Figure 2B:
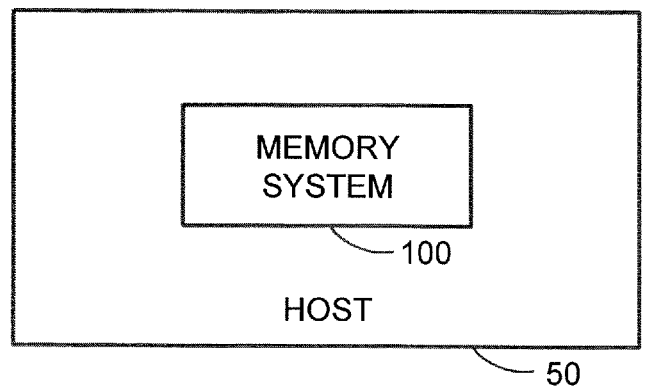
FIG. 2B is a block diagram of a memory system of an embodiment embedded in a host.

As shown in FIG. 2A, in some embodiments, the memory system 100 is removably connected to a host 50 (e.g., where the host 50 and memory system 100 can each have mating physical connectors that allow the memory system 100 to be removably connected to the host 50). In other embodiments (shown in FIG. 2B), the memory system 100 is embedded in a host 50 (FIG. 2B).

A host can take any suitable form. A host 50 typically has a controller and an interface for communicating with the memory system 100. In some implementations, the host 50 has a crypto-engine operative to provide encryption and/or decryption operations for communication with the memory system 100 (e.g., for mutual authentication, key exchange, and establishment of a secure channel). The host 50 can contain other components (e.g., a display device, a speaker, a headphone jack, a video output connection, etc.). Examples of hosts 50 include, but are not limited to, a mobile phone, a digital media player, a game device, a personal digital assistant (PDA), a personal computer (PC), a kiosk, a set-top box, a TV system, a book reader, or any combination thereof.

As mentioned in the background section above, some memory systems implement data identification methods in order to avoid mixing different data types in the same block when that data is written to the memory, as such mixing may cause the garbage collection process to be inefficient. For example, a block containing only sequential data will most probably require garbage collection at a lower rate than a block that contains both sequential and random data. However, eventually, the block containing only sequential data will require garbage collection as well. Memory systems typically chose blocks for garbage collection based the amount of valid data in the block, irrespective of data type. This means that, eventually, sequential and random data will be mixed together in a destination block as part of the garbage collection process, even though the data was separated when initially written. So, all benefit of segregating the data when initially written to the memory can be lost over time, as garbage collection may eventually mix the data types together.

The following embodiments can be used to address this situation. In general, the following embodiments describe a method for data classification by obsolescence of the data instead of (or in addition to) the initial classification of the data when the data was first written to memory. The initial classification may sometimes need correction, or the data may become unclassified during mixing different types of data. The following embodiments can be used to change the initial classification of data during garbage collection.

Figure 3:
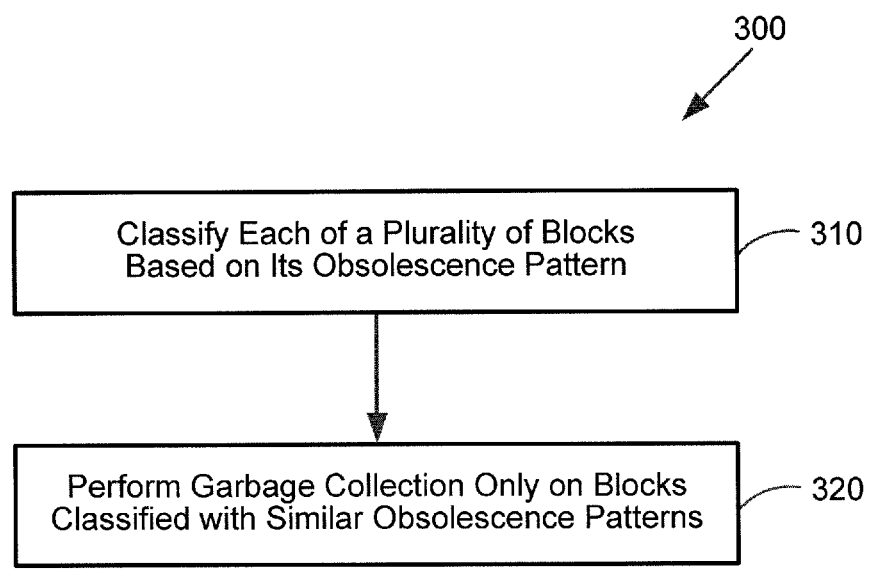
FIG. 3 is a flow chart of a method of an embodiment for performing garbage collection on blocks based on their obsolescence patterns.

As shown in the flow chart 300 in FIG. 3, in one embodiment, the memory system 100 classifies each of a plurality of blocks in the memory 120 based on its obsolescence pattern (act 310) and performs garbage collection only on blocks classified with similar obsolescence patterns (act 320). As used herein, the phrase "obsolescence pattern" can mean a pattern that is formed by the locations of invalid areas in a block (or, alternatively, valid areas in the block). In memories, such as flash memory, data can be written in a unit (a page) smaller than a block, but only the entirety of the block can be erased. So, if one or more pages in a block need to be re-written (e.g., when the data in those pages is updated or changed), new pages are written to fresh pages in the same or different block, and the earlier-written pages are marked as invalid (e.g., using a table in the memory system 100, using a flag in each page, etc.). So, over time, a block that was initially filled with all valid data can have some pages that are still valid and other pages that are not valid (obsolete). So, the locations of invalid data in a block form an "obsolescence pattern." As will be discussed more below, different obsolescence patterns can be indicative of different types of data stored in the block and can be useful in garbage collection operations.

Figure 4A:
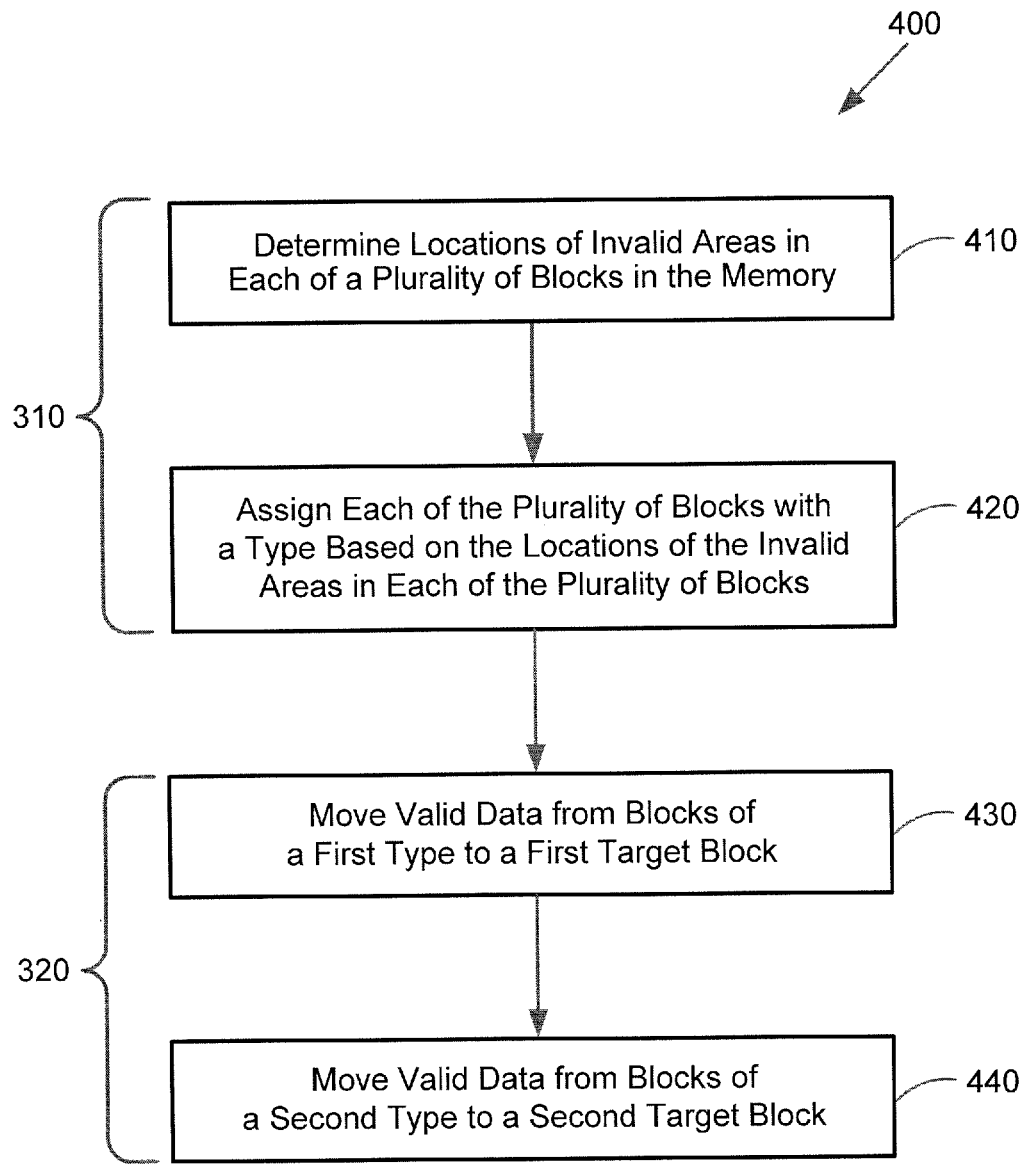
FIGS. 4A and 4B are flow charts of a method of an embodiment for classifying blocks and performing garbage collection.
Figure 4B:
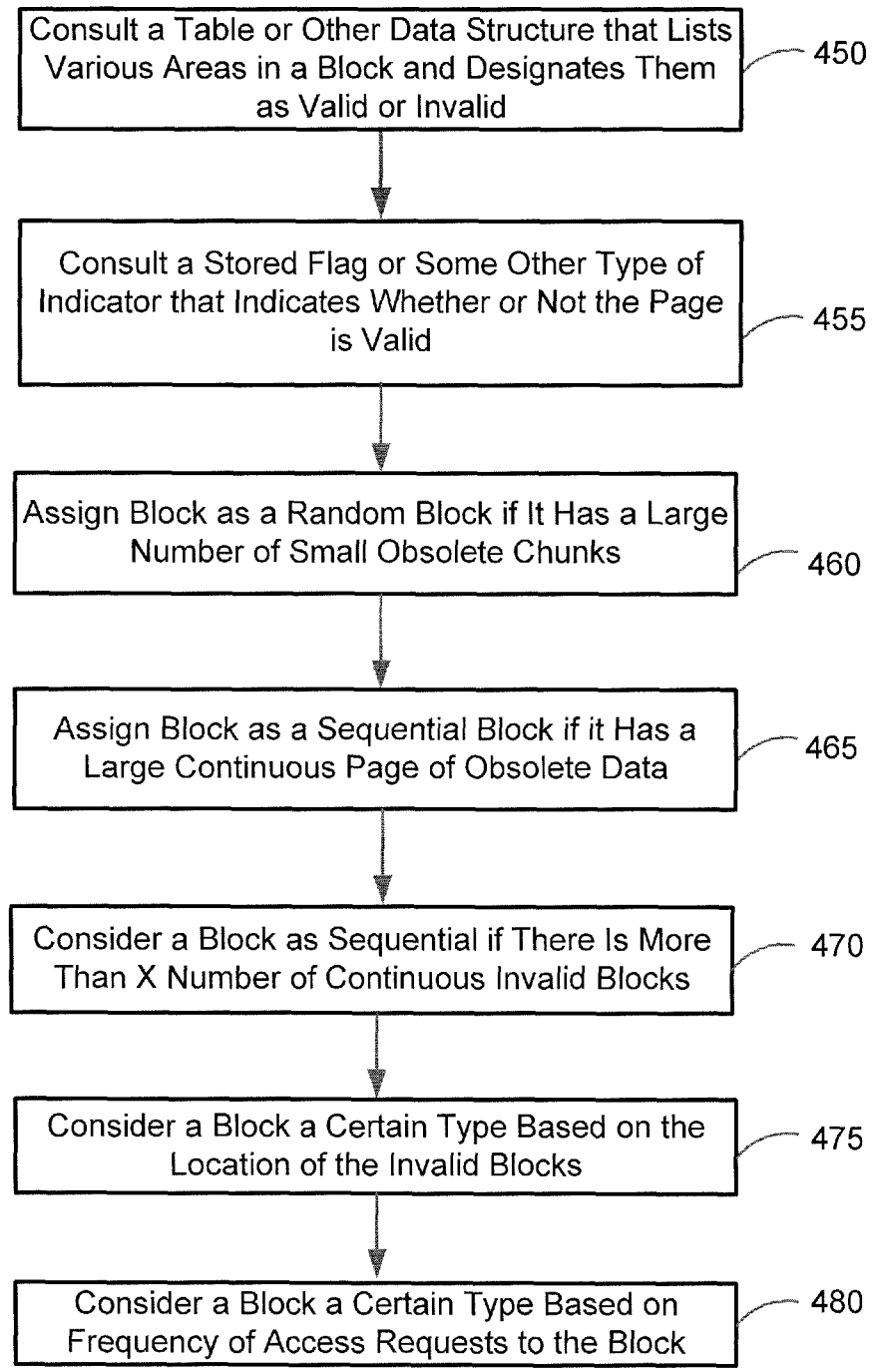

Turning again to the drawings, FIG. 4A is a flow chart 400 that illustrates the classification and garbage collection steps in more detail. As shown in FIG. 4A, to classify the data (step 310 in FIG. 3), the memory system 100 determines locations of invalid areas in each of a plurality of blocks in the memory (act 410) and assigns each of the plurality of blocks with a type based on the locations of the invalid areas in each of the plurality of blocks (act 420). These steps will be illustrated in conjunction with the illustrations in FIGS. 4B, 5A, 5B, 5C, and 6

Figure 5A:
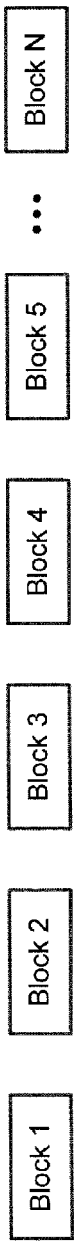
FIGS. 5A, 5B, and 5C are illustrations of blocks of an embodiment.
Figure 6:
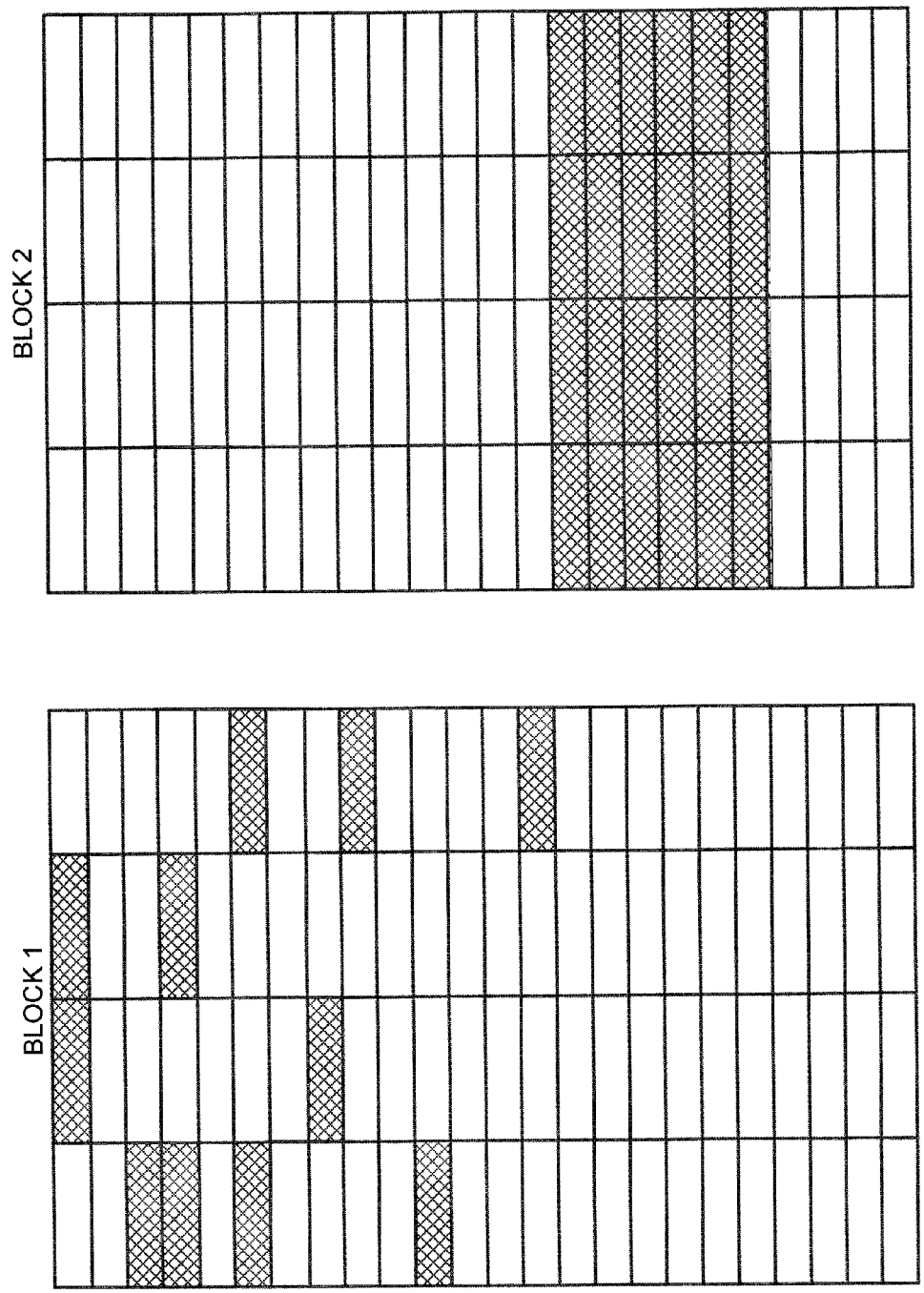
FIG. 6 is an illustration of a block obsolete bitmap of two of the block in FIGS. 5A, 5B, and 5C.

FIG. 5A shows Block 1 to Block N of the memory 120, and FIG. 6 is an illustration of a block obsolescence bit map of Blocks 1 and 2. To determine locations of invalid areas in each of a plurality of blocks in the memory (act 410), the memory system 100 identifies which area (e.g., pages) in the block are invalid. This can be done, for example, by consulting a table or other data structure that lists various areas in a block and designates them as valid or invalid (act 450). As another example, each page can have a memory location for storing a flag or some other type of indicator that indicates whether or not the page is valid (act 455). Of course, these are just examples, and other techniques can be used. With reference to FIG. 6, Block 1 has 11 invalid pages, which are largely non-continuous. Block 2 has 24 invalid areas, which are continuous.

Figure 5B:
Figure 5C:
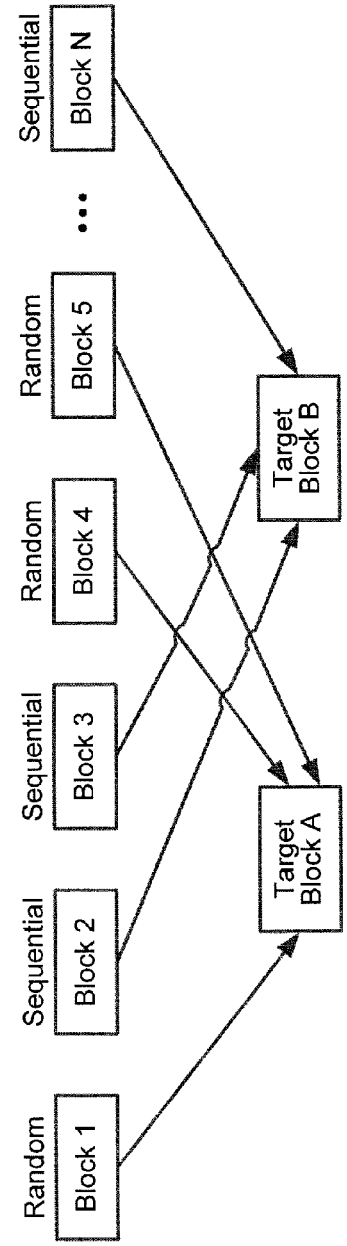

Next, the memory system 100 assigns each of the plurality of blocks with a type based on the locations of the invalid areas in each of the plurality of blocks (act 420). For example, in the illustration shown in FIG. 6, non-continuous invalid pages are typically associated with random data, while continuous invalid pages are typically associated with sequential data. (While random and sequential are two examples, it should be understood that types other than random and sequential can be used and that more than two types can be used.) So, as shown in FIG. 5B, Block 1 is assigned as a random block because it has a large number of small obsolete chunks (act 460), while Block 2 is assigned as a sequential block because it has a large continuous page of obsolete data (act 465). The same process is performed on the remaining blocks (or a subset of the remaining blocks), and FIG. 5B shows how those remaining blocks are assigned. It should be noted the pattern of invalid pages in a random (or sequential) block is likely not to be exactly the same block-to-block. So, the memory system 100 can use some threshold or other criteria to judge whether a block is one type or another. For example, in one embodiment, a block may be considered sequential if there is more than X number of continuous invalid blocks (act 470). In another embodiment, a block may be considered one type or the other based on the location of the invalid blocks (irrespective of whether the blocks are continuous) (act 475). As yet another example, a block may be considered one type or the other based on frequency of access requests to the block (act 480). Of course, other techniques can be used.

After the blocks have been classified, garbage collection can be performed only on blocks classified with similar obsolescence patterns. For example, as shown in the flow chart 400 of FIG. 4A, this can involve moving valid data from blocks of a first type to a first target block (act 430) and moving valid data from blocks of a second type to a second target block (act 440). In the example shown in FIG. 5C, this results in Blocks 1, 4, and 5 (the blocks classified as random) being moved to Target Block A and in Blocks 2, 3, and N (the blocks classified as sequential) being moved to Target Block B.

There are several advantages associated with these embodiments. For example, because garbage collection is performed only on blocks classified with similar obsolescence patterns, valid data from blocks of different types are moved to different target blocks, which preserves the initial classification, if any, of the data blocks. Further, by separately classifying blocks with random data from blocks with sequential data, each data type can be designated to a different target block through garbage collection. Maintaining data type separation can help support sequential write sustain performance (e.g., rewriting the same logical block address (LBA) range over and over). Additionally, maintaining data classification can improve system performance and endurance because it prevents a drift where a sequential block with a small random part will be cycled as a random block over and over again, increasing its random portion each time. In contrast, a long sequential portion of the block (e.g., a video file) will be cycled unchanged, just because it is adjacent to the random part, which becomes obsolete before the sequential part is deleted.

Also, as opposed to the prior methods of block classification, the classification performed in this embodiment can be done when needed at any given time in the block's life cycle and after the block has gone through a garbage collection operation because this embodiment takes into consideration information that does not exist at the time when the block is initially written. That is, this embodiment can classify a block in its current form instead of its initial form. This is especially useful for information, such as a data base, where the initial writing of the database is usually sequential, but subsequent updates to the database are random.

There are several alternatives that can be used with these embodiments. For example, while classifying the type of block can be done at any time, in one embodiment, the classifying is done after the plurality of blocks have been written to the memory 120 and after at least some of the plurality of blocks written to the memory 120 have been modified and/or have gone through garbage collection. This is in contrast to prior data identification methods that assign a data type to a same block when that data is written to memory. Also, in one embodiment, the classifying is done as part of garbage collection, while, in other embodiments, the classifying is done before the garbage collection process has started. Regardless of when it is done, the classifying can be done on all the blocks of memory or on only some of the blocks of memory.

Also, in one embodiment, the classification of the blocks is performed in run time according to a block obsolescence bitmap (such as the ones shown in FIG. 6). Using a bitmap avoids the need to store the block types in management tables because the type is there, in the bitmap. In the garbage collection stage, the type is known by observing the obsolescence bitmap. In another alternate embodiment, the memory system keeps track of the data types that were assigned during the initial writing of the data during the lifetime of the data (e.g., using management tables). In this way, the memory system can consult the management tables prior to garbage collection in order to ensure that garbage collection is being performed on data of the same type, so that only data of the same type will be written to the destination block.

Further, it should be noted that instead of the entire block being classified, a sub-block (i.e., a portion of a block) can be classified. For example, one physical block can comprise two sub-blocks, each with a different classification. In this case, the garbage collection operation can direct each portion of a different destination block. For simplicity, the term "block" is being used in the description and claims. However, it should be understood that "block" can mean "block" or "sub-block."

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for performing garbage collection on blocks based on their obsolescence patterns, the method comprising:
   performing the following in a controller of a memory system having a memory:
      classifying each of a plurality of blocks in the memory according to a first type or a second type based on its obsolescence pattern, wherein an obsolescence pattern comprises a pattern that is formed by locations of invalid areas in a block, and wherein the classifying is done after the plurality of blocks have been written to the memory and after at least some of the plurality of blocks written to the memory have been modified;
      performing garbage collection on blocks of the first type without including blocks of the second type; and
      performing garbage collection on blocks of the second type without including blocks of the first type.

2. The method of claim 1, wherein the first type is a random block, wherein the second type is a sequential block, and wherein the method further comprises:
   classifying a block with an obsolescence pattern comprising a plurality of non-continuous invalid areas as a random block, and
   classifying a block with an obsolescence pattern comprising a plurality of continuous invalid areas as a sequential block.

3. The method of claim 1, wherein the classifying is done after at least some of the plurality of blocks have gone through garbage collection.

4. The method of claim 1, wherein the classifying is done using a bitmap.

5. The method of claim 1, wherein the classifying is done as part of garbage collection.

6. The method of claim 1, wherein the memory is a three-dimensional memory.

7. The method of claim 1, wherein the memory system is embedded in a host.

8. The method of claim 1, wherein the memory system is removably connected to a host.

9. A non-transitory computer-readable storage medium storing computer-readable program code that, when executed by a processor, cause the processor to:
   determine a pattern of locations of invalid areas in each of a plurality of blocks in a memory of a memory system, wherein the determining is done after the plurality of blocks have been written to the memory and after at least some of the plurality of blocks written to the memory have been modified;
   assign each of the plurality of blocks with a type based on the pattern of locations of the invalid areas in each of the plurality of blocks;
   move valid data from blocks of a first type to a first target block; and move valid data from blocks of a second type to a second target block;

wherein valid data from blocks of different types are moved to different target blocks.

10. The computer-readable storage medium of claim 9, wherein a block is assigned to the first type when the invalid areas are located in non-continuous locations, and wherein a block is assigned to the second type when the invalid areas are located in continuous locations.

11. The computer-readable storage medium of claim 9, wherein the first type is random data, and the second type is sequential data.

12. The computer-readable storage medium of claim 9, wherein the determining is done after at least some of the plurality of blocks have gone through garbage collection.

13. The computer-readable storage medium of claim 9, wherein the determining is done using a bitmap.

14. The computer-readable storage medium of claim 9, wherein the assigning is done as part of garbage collection.

15. The computer-readable storage medium of claim 9, wherein the memory is a three-dimensional memory.

16. The computer-readable storage medium of claim 9, wherein the memory system is embedded in a host.

17. The computer-readable storage medium of claim 9, wherein the memory system is removably connected to a host.

18. A method for performing garbage collection, the method comprising:

performing the following in a memory system having a memory:

assigning each of a plurality of blocks in the memory with a type based on a pattern of locations of invalid pages in each of the plurality of blocks, wherein the assigning is done after the plurality of blocks have been written to the memory and after at least some of the plurality of blocks written to the memory have been modified;

moving valid pages from blocks of a first type to a first target block; and moving valid pages from blocks of a second type to a second target block;

wherein valid pages from blocks of different types are moved to different target blocks.

19. The method of claim 18, wherein a block is assigned to the first type when the invalid pages are located in non-continuous locations, and wherein a block is assigned to the second type when the invalid pages are located in continuous locations.

20. The method of claim 18, wherein the first type is random data, and the second type is sequential data.

21. The method of claim 18, wherein the assigning is done after at least some of the plurality of blocks have gone through garbage collection.

22. The method of claim 18, wherein the assigning is done using a bitmap.

23. The method of claim 18, wherein the assigning is done as part of garbage collection.

24. The method of claim 18, wherein the memory is a three-dimensional memory.

25. The method of claim 18, wherein the memory system is embedded in a host.

26. The method of claim 18, wherein the memory system is removably connected to a host.

27. A memory system comprising:

a memory;

means for assigning each of a plurality of blocks in the memory with a type based on a pattern of locations of invalid pages in each of the plurality of blocks, wherein the assigning is done after the plurality of blocks have been written to the memory and after at least some of the plurality of blocks written to the memory have been modified;

means for moving valid pages from blocks of a first type to a first target block; and means for moving valid pages from blocks of a second type to a second target block;

wherein valid pages from blocks of different types are moved to different target blocks.

* * * * *